(12) United States Patent
Leitch et al.

(10) Patent No.: US 7,574,216 B2
(45) Date of Patent: Aug. 11, 2009

(54) MAKING TIME-OF-FLIGHT MEASUREMENTS IN MASTER/SLAVE AND AD HOC NETWORKS BY EAVES-DROPPING ON MESSAGES

(75) Inventors: Adam S. Leitch, Brighton (GB); Martin S. Wilcox, Redhill (GB); Paul M. Fulton, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 243 days.

(21) Appl. No.: 10/598,815

(22) PCT Filed: Mar. 2, 2005

(86) PCT No.: PCT/IB2005/050767

§ 371 (c)(1),
(2), (4) Date: Sep. 12, 2006

(87) PCT Pub. No.: WO2005/091573

PCT Pub. Date: Sep. 29, 2005

(65) Prior Publication Data

US 2007/0184864 A1   Aug. 9, 2007

(30) Foreign Application Priority Data

Mar. 17, 2004   (GB) .................. 0406094.3

(51) Int. Cl.
*H04W 24/00* (2009.01)
*H04B 7/00* (2006.01)
*H04B 7/15* (2006.01)

(52) U.S. Cl. .................. 455/456.1; 455/507; 455/41.2; 455/11.1

(58) Field of Classification Search ... 455/456.1–456.6; 379/7
See application file for complete search history.

(56) References Cited

U.S. PATENT DOCUMENTS

| 5,510,800 | A | 4/1996 | McEwan |
| 5,589,839 | A | 12/1996 | Lindenmeier et al. |
| 6,006,097 | A | 12/1999 | Hornfeldt et al. |
| 6,307,848 | B1* | 10/2001 | Wood, Jr. ............... 370/329 |
| 7,187,924 | B2* | 3/2007 | Ohlenbusch et al. ..... 455/426.1 |
| 2002/0113735 | A1 | 8/2002 | Spratt |
| 2003/0174048 | A1 | 9/2003 | McCorkle |
| 2004/0266457 | A1* | 12/2004 | Dupray .................... 455/456.5 |
| 2005/0113090 | A1* | 5/2005 | Sharony ................... 455/436 |
| 2005/0135286 | A1* | 6/2005 | Nurminen et al. ........... 370/310 |
| 2006/0111042 | A1* | 5/2006 | Pitchers ..................... 455/20 |

* cited by examiner

*Primary Examiner*—Nick Corsaro
*Assistant Examiner*—Kathy Wang-Hurst (57) ABSTRACT

Method for obtaining range and/or positional information of electronic devices typically rely on a device (A) re-questing that another device (B) supplies a reply message (22), which contains some timing information (T2, T3) on the signals received and sent. Problems that arise in such networks comprise: firstly, some devices (C) may be out of range of the device (A) that initiates the ranging measurements, and secondly, some devices (B, C) may not be allowed to communicate with each other and thus, the distance between these devices cannot be found. This invention discloses that in these cases, eavesdropping on messages (21, 22, 24) passing between other devices (A, B, C) in the system can result in that distances between additional devices are found. Furthermore, by using eavesdropping the number of transmissions, and therefore the potential for collisions, is reduced. Thus, the power consumption of the nodes in the network can be lowered.

30 Claims, 5 Drawing Sheets

PRIOR ART

MAKING TIME-OF-FLIGHT MEASUREMENTS IN MASTER/SLAVE AND AD HOC NETWORKS BY EAVES-DROPPING ON MESSAGES

This invention relates to a method and apparatus for obtaining range or time of flight information between nodes in a wireless network.

The use of wireless networks has many advantages over wired networks and the management of the communication between the nodes of the network is significant to its success. In order to transmit data from one node to another the location of the node needs to be established and a route determined. The position of a wireless node can quickly change and the location of all nodes need to be constantly updated, making the management of the network more difficult.

An example of a wireless network is a network for an intelligent home wherein the user can control the electronic equipment of the home from a remote location and/or wherein the behaviour of the equipment changes with the location of the user. Nodes having low power consumption may be preferred in such networks. A low power consumption means the nodes can run on standard batteries that ideally are changed only once every several years or a couple of times a year at most. Alternatively, they can be powered by other means, for example using solar power panels. Accordingly, the cost of powering and maintaining the network is kept low. The conventional method of finding the distance between individual nodes in a network comprises a node A sending a ranging request to a node B. Node B sends a reply comprising information regarding the time that the request arrived and the time that the reply was transmitted. Node A can then calculate the distance between node A and node B. Moreover, the clock offset between the clocks of node A and node B can be determined, allowing the nodes to synchronise. Furthermore, if node A wants to communicate with a node C outside the transmission range of node A, but within transmission range of node B, node B can carry out the ranging procedure with respect to node C and report back to node A. After having received range information from many nodes within transmission range of node C, node A can then determine the optimal route through which it can communicate with node C.

However, there are a number of problems with this method: The range information needs to be updated on a regular basis and if there are a large number of nodes in the network, the ranging requests and responses may collide with other communication in the network. The ranging method may also cause a strain on low power nodes in the network resulting in the batteries of the nodes having to be changed more often than desired. Moreover, in master/slave networks wherein slaves are only allowed to communicate directly with the master and not with other slaves, the distances between two slaves cannot be determined. Consequently, the location of a node can only be specified one-dimensionally, i.e. as a distance from the master node.

U.S. Pat. No. 6,006,097 discloses a system and method wherein the number of messages transmitted between a mobile station and plurality of base stations in a wireless network, in order to find the location of the mobile station with respect to each of the plurality of base stations, is reduced. According to the disclosed method, the mobile station sends location information in a message that can be received by all of the plurality of base stations, instead of sending a separate message to each of the plurality of base stations. However, this method only allows the exchange of location information between the mobile station and a small proportion of the nodes, namely the base station. The mobile station cannot communicate location information directly to other mobile stations.

The invention seeks to solve these problems.

According to the invention there is provided a method of determining distance relationships between nodes in a network comprising a first, a second and a third node, wherein the second node is within transmission range of the first and the third node, the method comprising the third node eavesdropping on a first message sent from the second node to the first node.

In one embodiment the message comprises a first message being a response to a ranging request sent from the first node to the second node and the first message further comprises first timing information; moreover, the third node transmits a second message comprising second timing information in reply to the first message. If the first node receives the first message it has enough information to determine the distance between the first and the second node. Similarly, if the second node receives the second message, it has enough information to determine the distance between the second and the third node.

One of the advantages of the method is that only three messages need to be sent for the first node to determine the distance to the second node and the second node to determine the distance to the third node, whereas in the conventional method four messages are required.

Further, according to the invention, if the network is a master/slave network, and the second and third nodes are slave nodes, the method may further comprise the second message being addressed to the master device and the second node receiving the second message by eavesdropping.

Thus, another advantage of the invention is that distances between slave nodes in a master/slave network can be determined.

According to the invention there is also provided a device acting as a node in a wireless network having a first and a second node different from said node, the device comprising means for eavesdropping on a first message being transmitted from the second node to the first node, and timing means for measuring timing information. In one embodiment the node further comprises a transmitter for transmitting a second message in response to the first message wherein the second message comprises said timing information.

Thus, if the source node of the first message receives the second message, the distance relationship between the nodes can be determined.

Yet further, according to the invention, the node may be configured to transmit said second message in a time slot assigned to the node by the network coordinator. Consequently, congestion of data transfers may be avoided.

Yet further, according to the invention, the node may be configured to accept the first message while being in its sleep mode.

Embodiments of the invention will now be described, by way of example, with reference to the accompanying drawings, in which.

Figure 1:
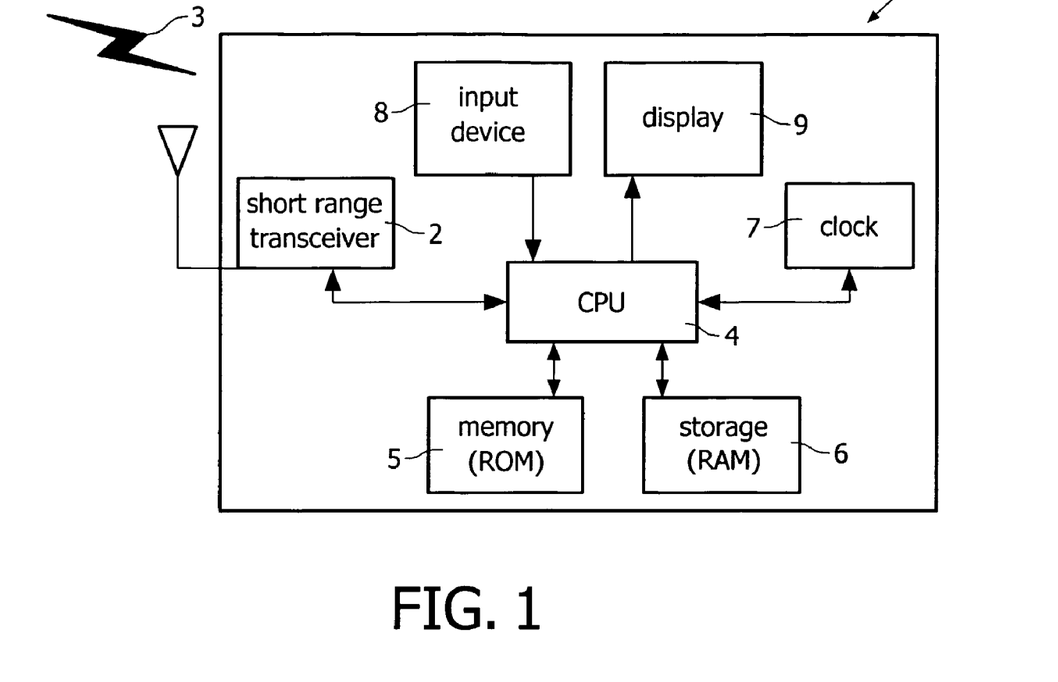
FIG. 1 is a schematic drawing of a low power device suitable for a wireless network.

Referring to FIG. 1, a device 1 providing a node for communication in a short-range network is shown. The node may be connected to a set-top box in the home, used for controlling a short-range network connecting individual electronic equipment together, or it may be a portable device worn by a user of the short-range network. Device 1 comprises a short-range transceiver 2 for transmitting and receiving radio frequency signals 3, a central processing unit 4, memory (ROM) 5, storage (RAM) 6 and an internal clock 7 for synchronising with other nodes. In one embodiment, device 1 further comprises an input device 8 and a display 9 for communicating with a user. The device is further connected to a battery (not shown). The network requires at least one node acting as a network coordinator. A user can communicate with the network coordinator using input device 8 and display 9 and thereby control the network. Alternatively, the user can use a mobile phone or a Bluetooth™ device to communicate with the network coordinator using radio frequency signals. Thus, in an alternative embodiment the coordinator may not have input device 8 and display 9.

Figure 2:
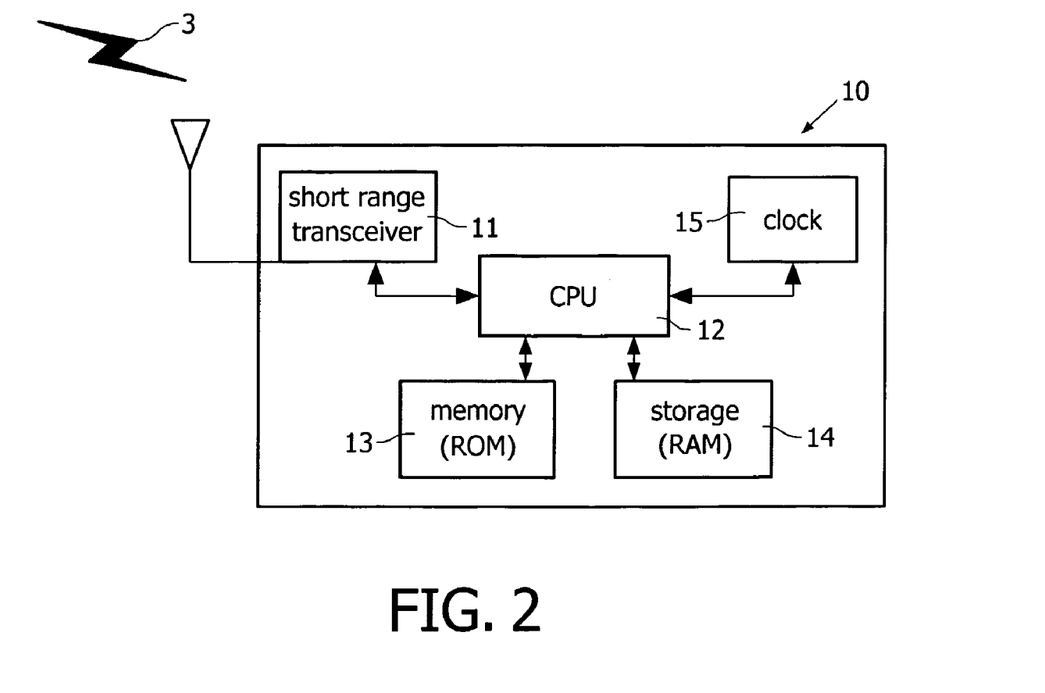
FIG. 2 is another schematic drawing of a low power device suitable for a wireless network.

Device 1 can thus act as a network coordinator. A network coordinator normally has enhanced functionality compared to the other nodes in the network. For example, the network coordinator may need more memory and storage to set up the network, initiate devices connecting to the network and storing information about each of the nodes included in the network. Referring to FIG. 2, an example of a device 10 not configured to act as a network coordinator is shown. Device 10 also comprises a short-range transceiver 11 for receiving and transmitting radio frequency signals 3, a central processing unit 12, memory (ROM) 13, storage (RAM) 14, and an internal clock 15. However, the processing unit has a lower processing capacity than the processing unit of device 1 and the memory and storage of device 10 are smaller than the memory and storage of device 1. Furthermore, the internal clock 14 of device 10 may be less accurate than the clock of device 1 since device 10 can synchronise with device 1 at regular intervals. Consequently device 10 may have lower power consumption than device 1 and be cheaper. There are a number of different ways in which device 1 and a plurality of devices 10 can communicate with each other. In a mesh network, every device, 10 or 1, can communicate directly with every other device, 10 or 1, within range. However, in a master/slave network device 1 can communicate with all other devices in the network but device 10 can only communicate with device 1.

Preferably device 10 and device 1 are compliant with ZigBee standards. However, the devices may also be compliant with other standards such as HomeRF, Bluetooth and IEEE 802.11x. According to the ZigBee standards, 255 devices can be wirelessly connected to form a network, although a greater number of devices can be wirelessly connected using multiple ZigBee networks. A device can operate in 2.4 GHz, 915 MHz and/or 868 MHz radio frequency bands; support raw data transfer rates of 250 kilobits per second (kbps), 40 kbps and 20 kbps respectively and have a transmission range typically between 10 and 75 metres. However, in order to lower the prices of the nodes the transmission range may be between 2 and 5 meters. An overview of the ZigBee standards may be obtained via the World Wide Web at www.zigbee.org or from the ZigBee Alliance, Bishop Ranch, 22694 Bishop Drive, Suite 275, San Ramon, Calif. 94583, USA.

Figure 3:
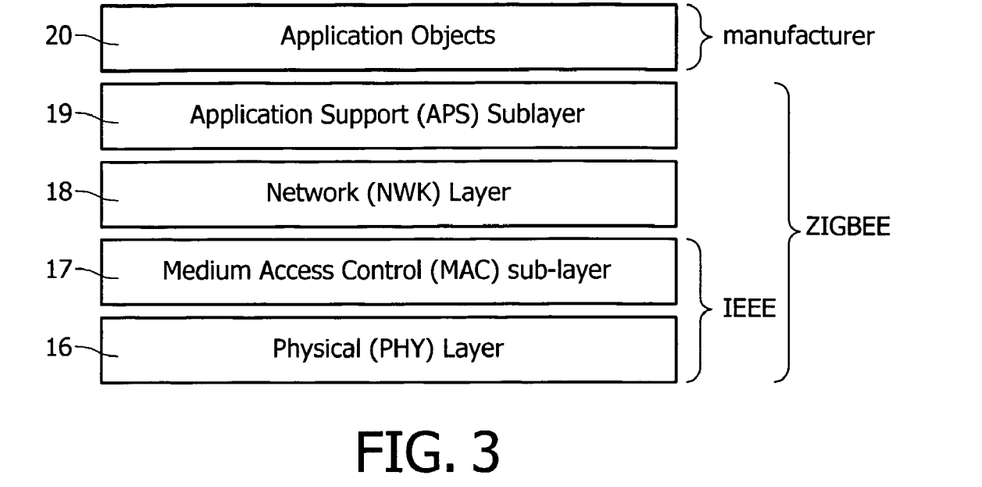
FIG. 3 illustrates the protocol layers in the devices illustrates by FIG. 1 and FIG. 2.

A protocol layer architecture of a device compliant with the ZigBee standard is shown in FIG. 3. The device operates according to a protocol based on the IEEE 802.15.4 standard developed for short-range low power devices. This standard includes a physical (PHY) layer 16 controlling the communication between devices. The PHY protocol defines the overall structure of the units of data, also referred to as the Physical Protocol Data Unit (PPDU), sent between devices. The PPDU comprises the MAC (Medium Access Control) Protocol Data Unit, defined by the MAC Protocol Layer 17. The MAC protocol Layer 17 defines the type of data transmitted in the data unit and it comprises algorithms for encryption. According to the ZigBee standard the protocol stack also comprises the Network (NWK) Layer 18 and the Application Support (APS) Layer 19. The NWK Layer 18 includes the protocol for setting up a network, joining and leaving a network, enabling the coordinator to assign addresses to devices in the network, routing frames to their intended destination and applying and removing security to outgoing and incoming frames respectively. The MAC layer 17 handles the security in single hop transfers but the Network layer 18 handles the security in multi-hop transfers. A single-hop transfer is a direct data transfer between two nodes in direct communication with each other, whereas a multi-hop transfer involves the transfer of data between a source node and a destination node not in direct communication with each other such that at least one intermediate node is used to forward the data from the source node to the destination node. Multi-hop transfers are common in ZigBee networks due to the short transmission range of the devices. All nodes in a network may not be within transmission range of each other and thus, neighbouring nodes have to forward the messages. The Application Support Layer 19 controls the ability to determine which other devices are operating in the personal operating space of a device and the ability to match two or more devices together based on their services and desires. The last layer, the Application Layer 20, allows the manufacturer to define application objects and implement the applications according to the ZigBee described application descriptions. The application layers also include ZigBee Device Objects that are responsible for defining the role of the node in the network, i.e. which node is the coordinator and which nodes are end nodes in the network. The ranging method according to the invention may be incorporated directly into the ZigBee protocol by adding extra command frames to deal with ranging and eavesdropping.

Figure 4:
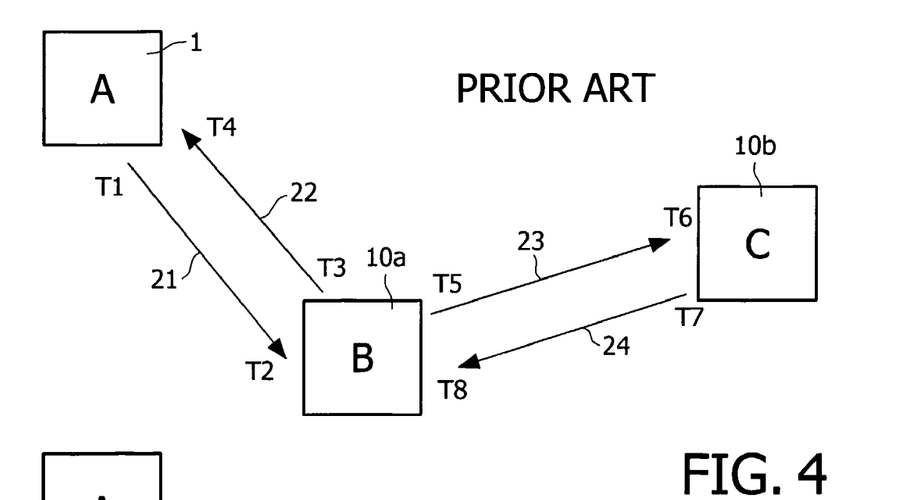
FIG. 4 illustrates ranging requests and responses sent in a wireless network according to a conventional method.

FIG. 4 shows a mesh network comprising nodes A, B and C. Node A comprises a device 1 that acts as the coordinator of the network. Thus, the terms 'device 1' and 'network coordinator' will hereinafter be used to refer to the same device. Nodes B and C of the network comprise devices 10a and 10b respectively. All nodes can communicate with all other nodes of the network. In order to manage the network, the network coordinator needs information about the distance between individual nodes in the network. In this example, node C is not within transmission range of node A, but node A can communicate with node C by instructing node B, which is within transmission range of both node A and node C, to forward data to node C. The network may further comprise additional nodes, not shown, that are within transmission range of both node A and node C and node C therefore wants to find the distance to node B and the distance between node B and node C in order to find the optimal route to contact node C. Thus, the coordinator sends a ranging request 21 at time T1 to device B. The coordinator stores the time of transmission (TOT) T1 in its Random Access Memory 6. Node B receives the ranging request, notes the time of arrival (TOA) of the ranging request, T2, and sends a ranging response 22 back to the coordinator A at time T3 comprising the value of T2 and T3. The controller receives the ranging response 22 at time T4 and records T2, T3 and T4 in its random access memory 6. Device 1 now knows the values of T1, T2, T3 and T4. Device 1 can find the distance between node A and node B by performing the calculation $$[(T2-T1)+(T4-T3)]*c/2 \qquad (1)$$

where c is the speed of light. The first term in equation 1 corresponds to the time it takes for the ranging request to travel from node A to node B and the second term is the time it takes for the response to travel from node B and node A. If the clocks of node A and node B are synchronised the first and second term of equation 1 are equal. However, if one clock is slightly delayed with respect to the other, the error in the first time has the opposite sign of the error in the second term, and thus, the errors cancel out. However, the time data further allows the calculation of the time delay between clock 7 and clock 15 such that the clocks can be synchronised. The clock delay is found by performing the calculation $$[(T2-T1)-(T4-T3)]/2 \qquad (2)$$

The calculated clock delay in equation 2 and the cancellation of clock delay errors in equation 1 are valid provided that the clocks do not drift significantly during the message exchange. In order for the calculated distance between nodes to be accurate, the time delay between the arrival of the request and the transmission of the response should be kept to a minimum such that the clocks do not drift a significant amount.

Instead of providing the time stamps T2 and T3, node B only needs to provide the delay between the arrival of the request and the transmission of the response, T3-T2, since:

$$[(T1+T4)-(T3-T2)]*c/2 \qquad (3)$$

is equivalent to equation 1. However, if only the time delay is provided the delay of the clocks cannot be calculated.

The above process can be repeated between node B and node C such that the distance between node B and node C can be found. Node B sends range request 23 to node C. Node C answers with a range response 24 to node B comprising the value of T6 and T7 and node B calculates the distance between node B and node C by performing the calculation $$[(T6-T5)+(T8-T7)]*c/2 \qquad (4)$$

If node B has synchronised with node A, and node C synchronises with node B, node B, node C and node A are all synchronised. Alternatively, the range response from node C to node B may only comprise the value of T7-T6. Thus, a total of four messages need to be sent in order to find the distances node A to node B and node B to node C.

Figure 5:
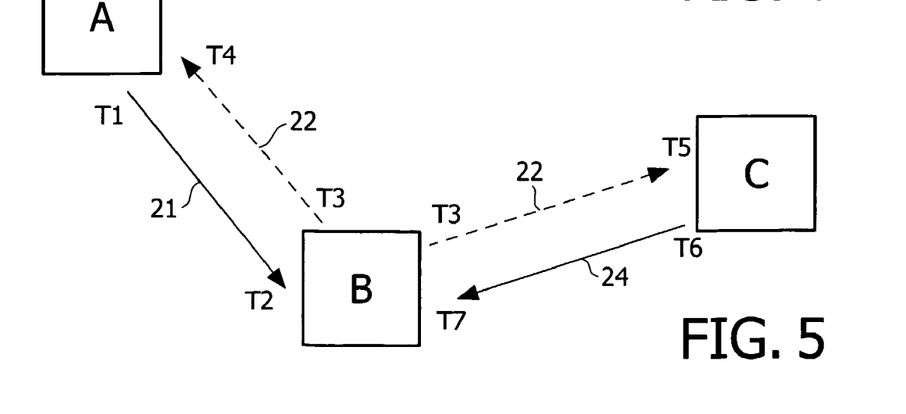
FIG. 5 illustrates ranging requests and responses sent in a wireless mesh network in accordance with the invention.

FIG. 5 shows a method of determining the distance between nodes, according to the invention, in which the number of transmitted messages is reduced. The method starts by the network controller A sending a ranging request 21 to node B at time T1. Node B notes the time of arrival T2, and transmits a ranging response 22 at time T3. The ranging response 22 comprises the values of T2 and T3. Node B further stores the value of T3 in storage 14. The controller A receives the response at T4, and uses the values of T1, T2, T3 and T4 to calculate the distance between the coordinator and node B as shown in equation 1. Meanwhile, node C, eavesdrops on the ranging response 22. The ranging response arrives at node C at time T5. Instead of waiting for a ranging request 23 from node B, node C transmits a ranging response 24 back to node B at time T6 including the arrival time (T5) of the ranging response 22 and the value of T6. Node B receives the ranging response at T7 comprising the values of T5 and T6 and since it already has saved the value of T3, it can now calculate the distance between node B and node C by performing the calculation $$[(T5-T3)+(T7-T6)]*c/2 \qquad (5)$$

Thus, the number of messages transmitted within the system has been reduced from four to three.

In an alternative embodiment, instead of including two time stamps in the message, i.e. T2 and T3, node B may reduce the amount of data sent by including the lapse in time between the arrival of the request and the transmission of the response, T3-T2. When node A receives the response it notes the time between the transmission of the request and the reception of the response T1-T4, and subtracts the time delay at node B, T3-T2, as shown in equation 3, in order to find the distance to node C. Similarly, instead of including both the time stamps T5 and T6 in ranging response 24, node C only includes the time delay at node C, T6-T5 and node B performs the calculation:

$$[(T7-T3)-(T6-T5)]*c/2 \qquad (6)$$

to find the distance between node B and node C.

Figure 6:
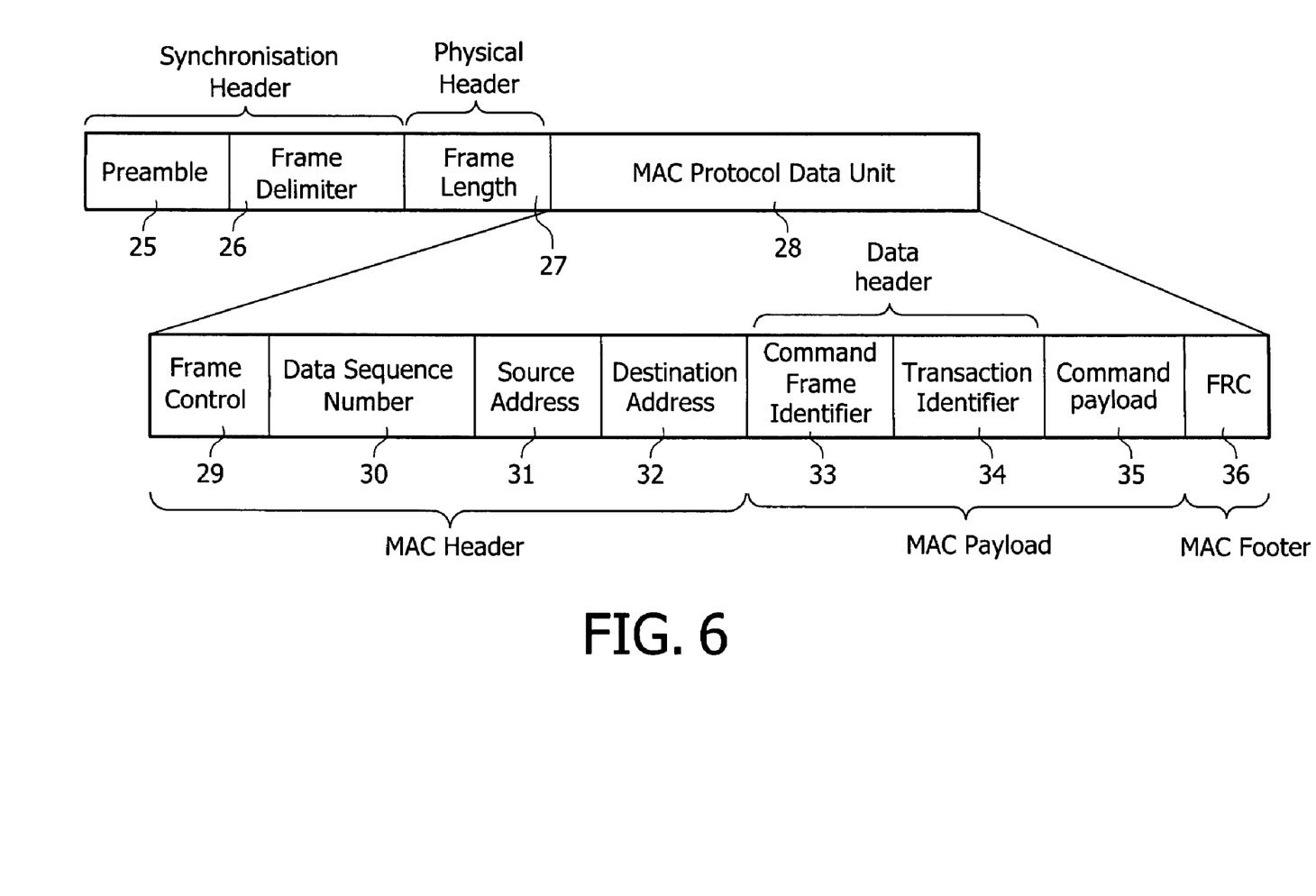
FIG. 6 illustrates the structure of the data sent between nodes in the wireless network in accordance with the invention.

The ranging requests and responses are preferably sent in a Physical Protocol Data Unit (PPDU) as shown in FIG. 6. The PPDU comprises a synchronisation header including a preamble 25 and a frame delimiter 26. The preamble is a sequence of 1s and 0s for warning any receiving devices that a message is on its way. The Frame Delimiter 26 announces the start of the message. The PPDU further comprises a Physical Header 27 comprising a field specifying the length of the remaining message. The remaining bytes of the data unit, the MAC protocol Data Unit 28 are defined by the MAC protocol 17 and includes a MAC header, a MAC payload and a MAC footer. The header includes the Frame Control field 29 for specifying the type of the frame and control data. There are four types of frames, a beacon frame, a data frame, an acknowledgement frame and a MAC command frame. In this embodiment, the ranging request and ranging responses are sent as part of a MAC command frame. The MAC header further includes the Data Sequence Number (30) for checking which data frame in the sequence a device is transmitting/receiving. An acknowledgment frame always has the same data sequence number as the frame of which it is acknowledging receipt. Acknowledgement frames are not necessary in the ranging method according to the invention since if the ranging response hasn't been received after a certain amount of time the timing information is not valid any more and a new ranging request has to be sent.

The MAC header further includes the Source Address field 31 and a Destination Address Field 32 specifying the 64-bit-addresses of the source node and the destination node of the message. A shorter 16-bit ZigBee address can be used in order to reduce the amount of data transmitted. If the ranging request or response is sent from the coordinator of the network, the source address does not need to be specified. Similarly, if a ranging request or response is sent to the coordinator, the destination address is left black. Consequently, ranging request 21 comprises a blank source address field and a destination address field specifying the address of device B. Ranging response 22 has a source address field specifying the address of device B and a blank destination address field. The source address field of response 24 comprises the address of node C and the destination address field of response 24 comprising the address of node B.

The MAC footer includes a frame check sequence 36, used for error checking. The MAC payload comprises a payload header comprising a MAC command identifier 33 for specifying the type of MAC command frame. According to the invention, the payload header may further comprise additional data for controlling the range requests and range responses. When the PPDU is a ranging request, the MAC command identifier specifies that the payload 35 is a request and the payload comprises a predictable sequence of data against which a node can correlate in order to find the time of arrival of the signal and a transaction ID. When the data unit 28 is a response, the MAC command identifier 33 specifies that the unit is a response and the payload 35 comprises a predictable sequence of data, the requested timing information and the transaction ID of the corresponding ranging request. It may further comprise a 'clock valid' flag specifying whether the timing information is valid. The predictable sequence of data is long enough for the receiving node to correlate against, but short enough such that the clocks of the two nodes do not drift significantly with respect to each other during the message exchange. A typical example of a predictable sequence is 25 bytes of null data, which lasts for exactly 800 µs and is enough to carry out measurements on in order to perform correlation. By specifying the time delay between the arrival of the request and the transmission of the response, instead of separate time stamps for the arrival and the transmission, fewer bits are used and thus, the procedure is more efficient. A typical time delay between receiving the request and transmitting the response is usually less than a millisecond, resulting in an over all time of the message exchange of a few milliseconds.

Figure 7:
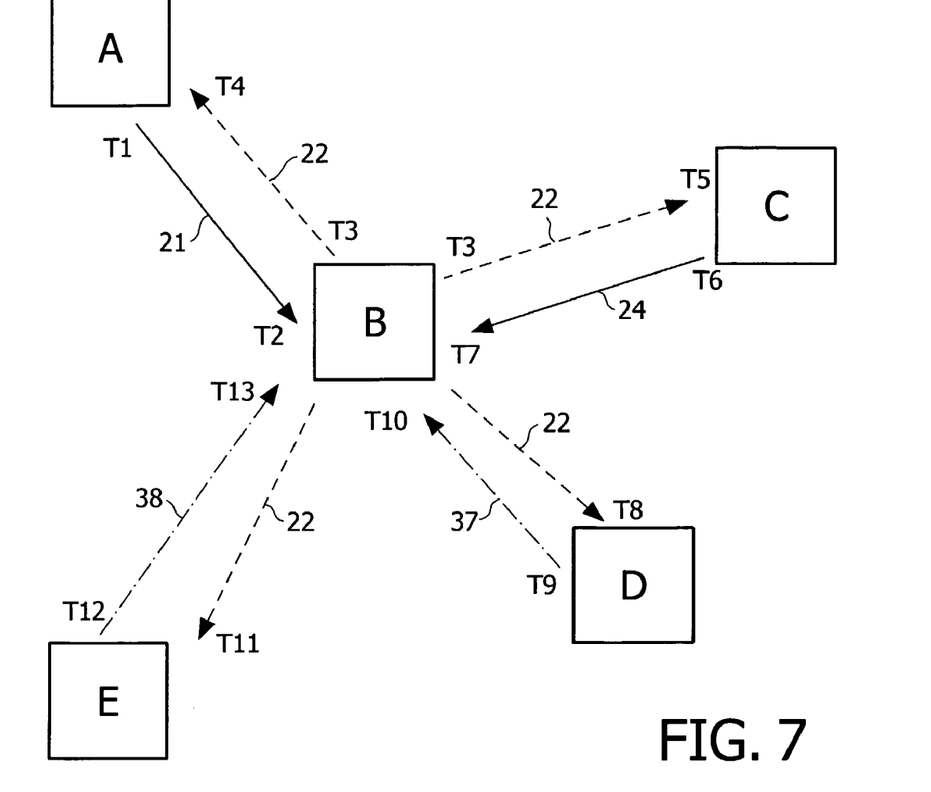
FIG. 7 illustrates the ranging requests and responses sent according to the invention in a wireless mesh network comprising a plurality of nodes.

In the network described above the number of PPDUs sent in order to determine the ranges between the devices is reduced by one compared to the method known in the art. However, the larger the number of nodes in a network, the larger the reductions in the number of messages sent. FIG. 7 shows a network comprising a controller and four nodes A-E, wherein the controller and nodes C-E are within transmission range of node B. Nodes C, D and E eavesdrop on the ranging response 22 sent from node B to the controller A. Each of devices C, D and E note the time of arrival, T5, T8, T11 of ranging response 22 and return ranging responses 24, 37 and 38 respectively. The ranging responses either comprise the time delays between the arrival of ranging response 22 and the transmission of ranging response 24, 37 or 38 respectively or they comprise the time stamps of the arrival and the transmission. After reception of all ranging responses 24, 37 and 38, node B has enough information to calculate the distances to node C, D and E.

The process according to the invention requires that the devices have the ability to receive and process messages intended for another device. ZigBee devices only have two modes, sleep mode and active mode. In the sleep mode the node only scans for beacons. The beacons are normally sent from the network coordinator to a node in sleep mode to instruct the node to change into active mode when another node wants to transfer data to it. In active mode, the node scans for messages from all nodes within transmission range. According to one embodiment of the invention, the conventional filtering method in the sleep mode is modified such that in addition to beacons, the node can also let through ranging messages.

Figure 8:
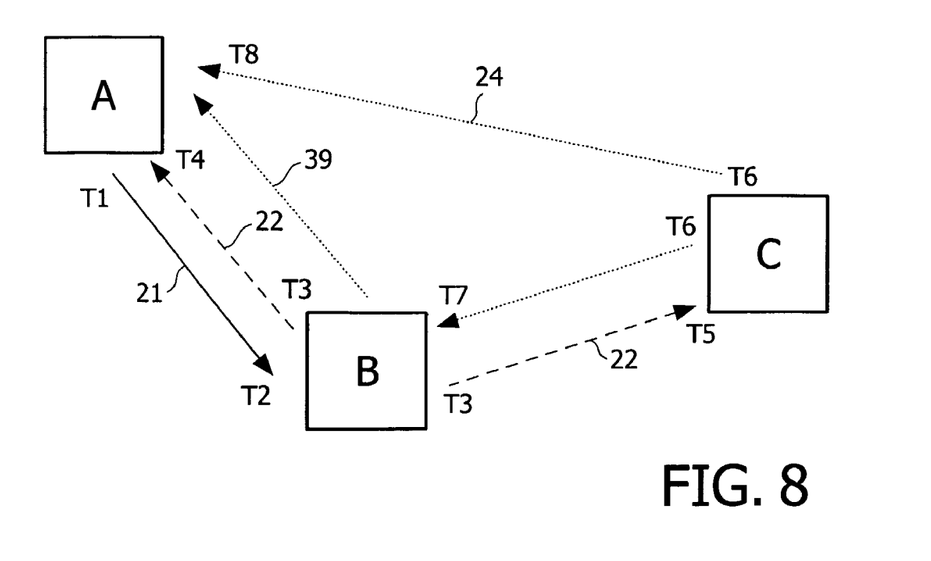
FIG. 8 illustrates the ranging requests and responses sent according to the invention in a master/slave network.

Referring to FIG. 8, a situation is shown, wherein the invention is used in a master/slave network is. The slave nodes in a master/slave network can only communicate directly with the master/coordinator node and consequently, all the nodes in the network need to be within transmission range of a coordinator node. As a consequence, distances can only be measured between the master and individual slaves. However, by also being able to measure distances between individual slave nodes in the network, much more information about the position of the nodes can be obtained. In the network shown in FIG. 8, node A is the master/coordinator of the network and node B and C are slave nodes. Node A sends a ranging request 21 to node B at time T1. Node B receives the ranging request at time T2 and transmits a ranging response 22 back to node A at time T3. The ranging response 22 comprises the values of T2 and T3. Node B further saves the value of time T3. Node A receives the ranging response 22 at time T4 and uses T1, T2, T3 and T4 to calculate the distance between node A and node B. Node C eavesdrops on ranging response 22 and notes the time T5 when the range response 22 arrived at node C. Node C cannot communicate directly with node B since node C and node B are both slave nodes. Node C is only allowed to communicate with the master node, node A. Consequently, node C addresses the response 24 to node A and relies on that node B will be eavesdropping and consequently be receiving response 24. Thus, in the master/slave network, the format of the Physical Protocol Data Unit has the same format as in the mesh network described above apart from that response 24 has a blank destination address field 32 since the response is only allowed to be addressed to the master. Response 24 is transmitted at time T6 and comprises the values of T5 and T6. Node B eavesdrops on response 24 and notes the time of arrival T7 of the response at node B. Consequently, node B now has T3, T5, T6 and T7 and can find the distance between node B and node C from equation 5. Thus, the distance between node B and node C can be found even though the nodes are not allowed to communicate directly with each other. Response 24 further arrives at node A at time T8. In a situation wherein node A has sent a separate ranging request to node A, ranging response 24 may be mistaken for a response to that ranging request. However, this is solved by including the transaction identifier 34 in the response. Node A compares the value of the transaction identifier 34 of response 24 with the transaction identifiers of ranging requests sent from node A and determines whether the timing information of response 24 is relevant.

By the exchange of ranging request 21, response 22 and response 24, node A now knows the distance to node B and node B knows the distance to node C. In one embodiment, node B sends a message 39 to node A informing node A about the distance between node B and node C such that node A can store updated information about the positions of all nodes in the network. Whereas in the conventional method, only the distances node A to node B and node A to node C could be found, the invention provides a method of finding the distance node B to node C as well, resulting in more information being obtained about the network.

In a typical ZigBee network CSMA/CA (Carrier Sense Multiple Access Collision Avoidance) procedures are followed in order to avoid collisions between messages and attempts to communicate with busy nodes. The procedures briefly involve the node waiting for a predetermined time, referred to as the back-off time, before trying to use a busy communication channel. Node B must have returned to receiving mode before device C can send a message to node B. In order for the delay between receiving and sending messages at C not to be too long, node B returns to receiving mode immediately after finishing the communication with node A and the back-off time of node C is set to a low value. The larger the number of devices the longer it will take for the collision avoidance algorithm to get the messages through to node B. However, the delay will be apparent to node B who can decide if the data is valid. In one embodiment the back off values of each devices is chosen at random and in an another embodiment each of the eavesdropping devices can be given a specific reply period, a set time after the receipt of message before it should respond. A dynamic system may allocate the reply periods in dependence on the levels of power supply in the node. For example, a node low on battery may be given an early reply period.

In master/slave Networks, ZigBee devices may employ Super Frame Structures to allow communication between nodes. The standard of a superframe is bounded by network beacons and is divided into 16 equally sized slots wherein the first and last frames are beacon frames and the second to the $15^{th}$ frame are used by all other devices wanting to communicate. The Master may dedicate portions of these frames, so called guaranteed time slots (GTS) to devices wishing to communicate. According to the invention, the master may allocate a time slot to Device C immediately following the time slot used by Device B to send the response in order to keep the overall time period of the message exchange as short as possible.

Figure 9:
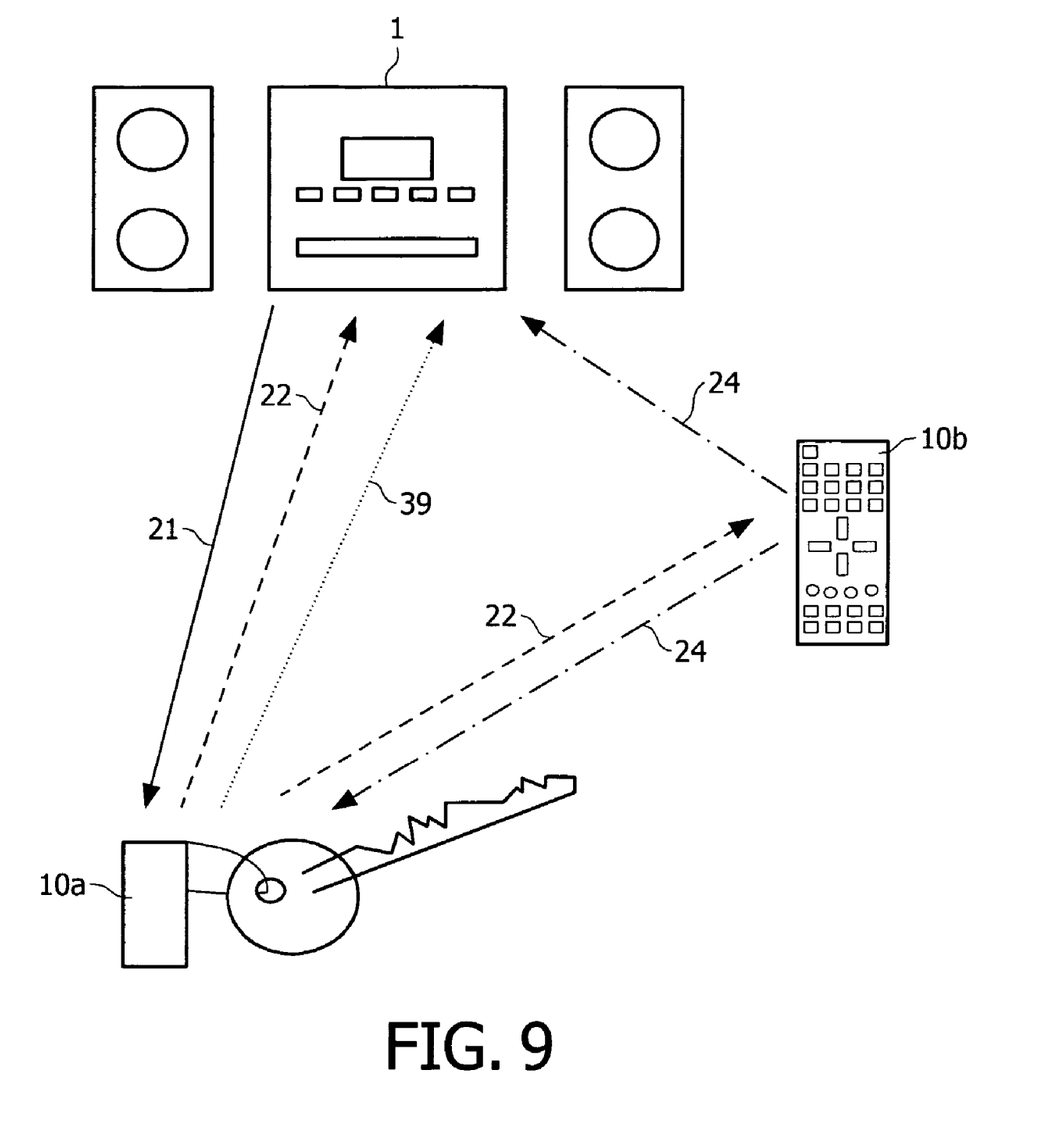
FIG. 9 illustrates a concrete example of a situation in which the invention can be used.

FIG. 9 illustrates how the process and an apparatus operating in accordance with the invention can be employed in an every day situation in a household. A typical house comprises a range of electronic devices. The house may have a hi-fi system comprising a ZigBee device 1 and a remote control comprising a device 10b. The device 1 connected to the hi-fi system may be the coordinator of the network. The owner of the house may have attached another device 10a to her keys and have lost the keys in the house. The keys, the hi-fi system and the remote control form a Master/Slave network. The coordinator stores information about all nodes in the network. It may further store names of each node in the network and a table associating each name with a ZigBee address. The name associated with the keys may be OWNER'S KEYS. The owner uses the input device 8 and the display 9 to enquire the network about his keys. For example, he may enter "OWNER'S KEYS?" using the input device 8. The controller understands the input as an instruction to find the location of the keys and accordingly sends a ranging request 21 to the keys. The keys reply with a ranging response 22. Meanwhile, the remote control is eavesdropping on the ranging response 22 and sends ranging response 24 to the hi-fi system. The keys eavesdrops on ranging response 24, works out the distance between the keys and the remote control and sends a message 39 comprising the value of the distance between the keys and the remote control to the hi-fi system. Finally, device 1 attached to the hi-fi system uses display 9 to display the location of the keys to the owner in the form: 'The OWNER'S KEYS are four meters from the hi-fi system and three meters from the remote control'.

In the examples above, the ranging procedures have been initiated by the network coordinator. However, it will be evident to a person skilled in the art, that the ranging procedures can be initiated by any node in the network. Moreover, the eavesdropping device may eavesdrop on any message sent from a node within transmission range, including the ranging request of a device, initiating the ranging procedure, provided that the initiating device is within transmission range of the eavesdropping device. Moreover, in the above examples, the calculation of the distance between node C and node B was described to be performed in node B. However, if, for example, node B is low on power, it may transmit the timing information to the coordinator or any other node in the network for them to work out the distance. Consequently, node B may save power.

Although Claims have been formulated in this Application to particular combinations of features, it should be understood that the scope of the disclosure of the present invention also includes any novel features or any novel combination of features disclosed herein either explicitly or implicitly or any generalisation thereof, whether or not it relates to the same invention as presently claimed in any Claim and whether or not it mitigates any or all of the same technical problems as does the present invention. The Applicants hereby give notice that new Claims may be formulated to such features and/or combinations of such features during the prosecution of the present Application or of any further Application derived therefrom.

The invention claimed is:

1. A method of obtaining distance relationships between nodes in a network comprising a first (A), a second (B) and a third node (C), wherein the second node is within transmission range of the first node and the third node, the method comprising:
   the third node (C) receiving a first message (22) being transmitted from the second node (B) to the first node (A) and transmitting a second message (24) in response to the first message (22) and the second message (24) comprising second timing information; and
   the second node (B) receiving the second message (24) and determining the distance between the second node (B) and the third node (C) by considering the time of transmission of the first message (T3), the time of reception of the second message (T7) and the second timing information.

2. The method as in claim 1, wherein the first message comprises a range request.

3. The method as in claim 1, wherein the first message (22) comprises first timing information and is a response to a range request (21) sent from the first node (A) to the second node (B).

4. The method as in claim 3 further comprising the first node (A) determining the distance between the first node and the second node by considering the time of transmission of the ranging request (T1), the time of arrival of the first message (T4) and the first timing information of the first message.

5. The method as in claim 3 wherein the first timing information comprises the time of arrival of the ranging request (T2) at the second node and the time of transmission (T3) of the first message from the second node.

6. The method as in claim 3, wherein the first timing information comprises the time delay between the arrival of the ranging request and the transmission of the first message at the second node (T3–T2).

7. The method as in claim 1, wherein the second timing information comprises the time of arrival of the first message (T5) at the third node (C) and the time of transmission (T6) of the second message from the third node.

8. The method as in claim 1, wherein the second timing information comprises the time delay between the arrival of the first message at the third node and the transmission of the second message from the third node (T6–T5).

9. The method of claim 1, wherein the network is a master/slave network, the first node (A) is the master node and the second (B) and third (C) nodes are slave nodes, and wherein the second message (24) is addressed to the master device (A) and the second node (B) receives the second message by eavesdropping.

10. The method of claim 1, wherein the network is mesh network and said second message (24) is addressed to said second node (B).

11. The method of claim 10 wherein the third node (C) is not within the transmission range of the first node (A).

12. The method of claim 1, wherein the request (21), the first message (22) and the second message (24) are comprised in a MAC command frame (29-36).

13. The method of claim 1, wherein the request (21), the first message (22) and the second message (24) each comprise a transaction ID (34) and the transaction ID of the request, the first message and the second message match.

14. The method of claim 13, wherein the transaction ID (34) is selected at random by the first node.

15. The method of claim 1, wherein the request (21), the first response (22) and the second response (24) are sent according to the IEEE 802.15.4 standard.

16. The method of claim 1, wherein the network comprises a plurality of nodes (C, D, E) eavesdropping on the first message (22) and sending a plurality of messages (24, 37, 38), the second node (B) receiving the plurality of messages and calculating the distances from the second node (B) to each of the plurality of eavesdropping nodes (C, D, E) and wherein each of the plurality of nodes are assigned a reply period to avoid collision of messages.

17. The method of claim 16 wherein the reply period of each node is assigned in dependence on the power capability of the plurality of nodes.

18. The method of claim 16 wherein the reply period of each node is assigned at random.

19. A device operable in a wireless network having a first node (A), a second node (B), and a third node (C) different from said first and second nodes, the device comprising at the third node (C):
  means (11) for receiving a first message (22) being transmitted from the second node to the first node;
  timing means (15) for measuring first timing information indicative of a time of transmission of the first message (22); means for transmitting a second message (24) to the second node (B) in response to the first message (22) and the second message including second timing information; and
  means for determining a distance between the second node (B) and the third node (C) based on the time of transmission of the first message (22), a time of the reception of the second message (T7) by the second node (B), and the second timing information.

20. The device according to claim 19 further comprising a transmitter (11) for transmitting a second message (24) in response to the first message comprising said timing information.

21. The device as in claim 20 wherein the timing information is based on the time of arrival of the first message (T5) and the time of transmission of the second message (T6).

22. The device as in claim 20 wherein the device is configured to transmit said second message (24) in a time slot assigned to the device by the coordinator (A) node of the network.

23. The device as in claim 20, wherein the first message (22) comprises a transaction id (34) and the device is configured to include a transaction id (34) in the second message (24) based on to the transaction id of the first message.

24. The device as claim 19 wherein the device operates according to the ZigBee standard.

25. The device as in claim 24 wherein the device is configured to accept said first message during its sleep mode.

26. A network comprising a plurality of nodes as claimed in claim 19.

27. The network of claim 26 comprising a mesh network.

28. The network of claim 26 comprising a master/slave network.

29. A computer readable medium which stores a computer program which controls a software controllable device to perform the method according to claim 1.

30. A apparatus operable in a wireless network including a first node (A), a second node (B), and a plurality of additional nodes (C, D, E) different from said first and second nodes, the apparatus comprising at each of the plurality of additional nodes (C, D, E):
  a short range transceiver which receives a first message (22) being transmitted from the second node (B) to the first node (A) and transmit a second message to the second node (B) in response to the first message (22);
  wherein the first message includes a transaction ID and first timing information indicative of a time of transmission of the first message (22) and the second message includes second timing information including a time of arrival of the first message (T5) at the third node (C), a time of transmission (T6) of the second message from the third node (T6-T5), and a matching transaction ID (34) based on the first message (22);
  an internal clock (15) which measures the first timing information and the second timing information; and
  a central processing unit which determines a distance from the second node (B) to each of the plurality of eavesdropping nodes (C, D, E) based on the time of transmission of the first message (22), a time of reception of the second message (T7) by the second node (B), and the second timing information.

* * * * *